United States Patent Office 3,652,542
Patented Mar. 28, 1972

3,652,542
PROCESS FOR PREPARING ETHERIFIED DEPOLYMERIZED STARCH PRODUCT COMPATIBLE WITH POLYVINYL ALCOHOL
Erling T. Hjermstad and Leonard J. Coughlin, Cedar Rapids, Iowa, assignors to Penick & Ford Limited, Cedar Rapids, Iowa
No Drawing. Filed July 15, 1969, Ser. No. 841,961
Int. Cl. C08b *19/06*
U.S. Cl. 260—233.3 R     5 Claims

ABSTRACT OF THE DISCLOSURE

An etherified depolymerized starch product exhibiting compatibility with aqueous polyvinyl alcohol solutions useful for size or adhesive application, said starch product consisting essentially of starch containing —COOX groups, wherein X is a cation selected from Na+, K+, or NH$_4$+, in the amount of 0.3 to 3% by weight based on said product of —COONa, or molar equivalent of —COOK or —COONH$_4$, said —COOX groups being present as starch—O—CH$_2$—COOX, or as a mixture of starch—O—CH$_2$—COOX and starch—COOX, said mixture containing at least 0.1% —COONa, or molar equivalent of —COOK or —COONH$_4$, as said

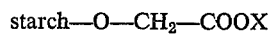

said starch product being further characterized by an alkali fluidity of less than 95 and above 5 and by being substantially free of inorganic salts. The corresponding starch—O—CH$_2$CH$_2$—COOX groups can be substituted for the starch—O—CH$_2$—COOX groups.

BACKGROUND

Starch has been used with polyvinyl alcohol (PVA) for a number of years, particularly in adhesives and textile sizes. The incorporation of PVA improves bonding strength, film strength and flexibility, grease and oil resistance, water resistance, etc. Generally, the more highly hydrolyzed grades of PVA are used with starch in proportions up to 1 part of PVA to 3 parts of starch.

While PVA has been used commercially with starch for adhesives and textile sizes, there has been very little success in developing mixtures of PVA and starch which give the desired improvement and are economically feasible. PVA is a relatively high cost material and it is necessary to use an extender, such as starch, dextrin, casein, clay, calcium carbonate, etc., to lower costs. Starch would appear to be an ideal extender because of its extremely low relative cost and its ability to form fairly strong and flexible grease and oil resistant films. However, attempts to formulate PVA-starch mixtures with sufficient PVA to attain worthwhile improvement in sized paper have been unsuccessful due to the tendency of starch and PVA to separate into a 2-phase system when proportions of starch and PVA greater than about 10% of either one with the other are dispersed in water. It would be desirable to use from 10% to 50% PVA in the PVA-starch mixture to obtain worthwhile improvement in paper sizes. Another effect higher ratios of PVA to starch during paper sizing have is the rejection of one component when the sized paper is passed through the rolls of a size press, thus changing the ratio in the remaining size and causing a deterioration in sized sheet properties on continued operation. For these reasons, there has been very little commercial use of PVA-starch mixtures for paper sizing, especially at paper size viscosity and concentration levels.

A great number of starch varieties, starch modifications, starch derivatives, and dextrins have been evaluated with PVA in attempts to overcome these deficiencies and develop formulations which will give satisfactory performance at economically feasible proportions of components. Ordinary commercial starches such as unmodified starch, acid-thinned starch, or dextrins made from the common varieties of starch gave very poor performance. Oxidized starches and hydroxy-ethylated starches gave improved performance (Elvanol Brochure Du Pont Co. 1967, p. 15) but negligible commercial success has resulted. The use of esterified or etherified starches containing carboxyl radicals was suggested in 1957 in U.S. Pat. 2,808,380. These show some improvement as do oxidized starches which also contain carboxyl groups. However, neither oxidized starches nor derivatized starch with carboxyl radicals have been sufficiently suitable to result in commercial development of economically feasible, improved performance starch-PVA paper sizes. There has, therefore, been a definite need for a starch product which can be used with PVA in proportions up to 50% of each without phase separation and rejection of components during size press operation.

SUMMARY

This invention is based on the discovery that the compatibility of starch with polyvinyl alcohol depends on a number of complex and interrelated factors, including the degree of —COOX substitution by etherification and/or oxidation, the extent of depolymerization, and the freedom of the product from inorganic salts. Using —COONa as the base, the starch should contain from 0.3 to 3% by weight of the sodium carboxy groups (or molar equivalent of potassium or ammonium carboxy groups). The extent of depolymerization, as determined by alkali fluidity, should be such that the starch product has an alkali fluidity of less than 95 and above 5. In addition, it is critical that the product can substantially be free of inorganic salts, such as sodium chloride or sodium sulfate, which are frequently present in high concentrations during the etherification of starch.

The invention in its preferred embodiments includes other important discoveries. While the starch product can be thinned or depolymerized by acids or enzymes, hypochlorite oxidation is preferred. It has been found that such oxidation not only thins the etherified starch to the necessary fluidity, but also, under alkaline conditions, introduces additional —COOX groups. Where the carboxyalkyl ether product is depolymerized by acid, it has been discovered that a special treatment is desirable to break any crosslinks, which may be formed. The resulting product will contain the —COOX groups in the form of

where *n* equals 1 or 2. Preferably, however, the product contains the —COOX groups in the form of a mixture of starch—O—CH$_2$—COOX and starch—COOX, the latter modification resulting from the hypochlorite oxidation.

The preferred substitution and alkali fluidity ranges, substituent groups, salt content, and other criteria, will be described in the following detailed specification. It will be understood that these form part of the present invention, and provide the means for maximizing the advantages of the invention.

DETAILED SPECIFICATION

The starting material for the present invention can be any granule starch, such as the starches derived from corn, potatoes, waxy maize, tapioca, etc. These starches in their original unmodified state are obtained in granular form, being cold water insoluble, and being subject to gelatinization on heating in water. As is well known in the art, the granule structure of starch persists even during such modification treatments as etherification, acid-conversion to thin-boiling types of starch, and hypochlorite oxidation. The term "starch" is therefore used in its broad or generic sense in this application as referring to any of the known varieties of starch.

In the practice of the present invention, the granule starch is etherified with a carboxyalkylating agent to introduce carboxyalkyl ether groups. Suitable carboxyalkylating agents are alkali metal monochloracetate, alkali metal salt of 3-chloropropionic acid, acrylamide, and acrylonitrile. The etherification of granule starch to introduce alkali metal carboxymethyl groups is described in U.S. Pat. 2,773,057.

Alkali metal carboxyethyl groups are also effective in the present invention. These can be introduced into starch by reaction under strongly alkaline conditions, for example, in aqueous NaOH or KOH containing NaCl or $Na_2SO_4$ to prevent starch swelling, with reagents such as acrylamine, acrylonitrile, or 3-chloropropionic acid. Ammonium carboxyalkyl starch ether groups are also effective. These can be introduced by removing the alkali metal from alkali metal carboxyalkyl starch, for example, by ion-exchange, to form starch—O—$(CH_2)_n$COOH, then neutralizing with ammonia to form

starch—O—$(CH_2)_n$COONH$_4$

The resulting etherified starch is then subjected to depolymerization. Depolymerization of the etherified starch product is essential to obtain products which do not show phase separation when dispersed in water with high proportions of PVA at low viscosity levels. The depolymerization can be done by acids, for example, HCl or $H_2SO_4$, and the thinned product neutralized and washed free of salts on a filter or centrifugal equipment. The acid depolymerization is conducted in water suspensions at temperatures below the swelling temperature of the etherified product. Sufficient acid to lower the pH to around 1.0 is added. Lower pH will give a faster rate of acid depolymerization. Oxidizing agents can be used to depolymerize the etherified starch. These have the advantage of increasing the anionic groups in the starch polymer structure while at the same time thinning or depolymerizing to a low viscosity level. Suitable oxidizing agents are hypochlorites, such as sodium hypochlorite, persulfates, such as ammonium or alkali metal persulfates, and peroxides, such as hydrogen peroxide or sodium peroxide. Sodium hypochlorite is the preferred oxidizing agent and under alkaline conditions it is an effective thinner and contributes additional sodium carboxy groups. The proportion of oxidizing agent used can vary widely, depending upon the reaction conditions, particularly the pH of the starch suspension. Sodium hypochlorite used in a proportion range of from 1 to 6% available chlorine based on starch solids, results in sufficient depolymerization. The use of from 2% to 5% available chlorine based on starch solids is preferred. Enzymes, for example alpha amylase, can be used to depolymerize the etherified product in the gelatinized state. Very low proportions of these enzymes, such as .05 to .25% based on starch solids are effective.

Following etherification and depolymerization, the starch is filtered, and washed to a low salt content. As indicated above, the starch product should be substantially free of inorganic salts. In general, the water-soluble salt content should be less than 1.5% by weight, and preferably less than or at least not over 1.0% by weight. The optimum range is about 0.1 to 0.5%.

The degree of depolymerization can be specified in terms of the alkali fluidity of the depolymerized product. This viscosity measurement is commonly used to characterize thin-boiling and oxidized starches in the corn-wet-milling industry. The method is described in "Chemistry and Industry of Starch" 2nd ed., by R. W. Kerr, Academic Press, N.Y., 1950, p. 133–134.

Alkali fluidities ranging from 5 to 90 are suitable in the present process. Fluidities of from 30 to 90 are preferred. While it is convenient to first etherify the starch and then depolymerize it, the reverse sequence can also be used in certain cases.

Since the foregoing depolymerization processes are well-known in the art, it will not be necessary to describe them further herein. The oxidation of starch with alkaline hypochlorite is described in standard treatises such as Chemistry and Industry of Starch, Kerr, Academic Press, Inc. (2nd 1950). In addition to the depolymerization, it is generally accepted that —COOX groups are introduced into the starch. These —COOX groups are formed from the carbon atoms of the glucose unit and oxidized starch is designated in this specification as starch—COOX. Alkali metal or ammonium carboxyalkyl ethers of starch are herein designated as

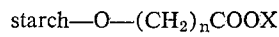

starch—O—$(CH_2)_n$COOX ($n=1$ or 2). In a preferred embodiment of the present invention, the etherified depolymerized starch product contains a mixture of starch—O—$CH_2$—COOX and starch—COOX. Further, the mixture contains at least 0.1% —COONa, or a molar equivalent of —COOK, or —COONH$_4$ in the form of starch—O—$CH_2$—COOX. When the starch product contains a total of 0.4 to 2.0% by weight of —COONa (or molar equivalent group), as preferred, optimum benefits are obtained when the starch product contains at least 0.2% of —COONa (or equivalent group) as starch—O—$CH_2$—COONa. Consequently, when the starch is to be thinned by hypochlorite oxidation, as is preferred, the amount of —COOX groups introduced in the etherification can be kept to a lower level, the stated ranges applying to the amount of such groups introduced by etherification plus the amount introduced by the hypochlorite oxidation.

It has been discovered that when carboxyalkyl starches, such as etherified starch having sodium carboxy radicals in the attached group, are acid-depolymerized, the starch becomes resistant to gelatinization to a dispersed, low-viscosity state. This appears to be due to the formation of ester cross-links between the carboxyls and the hydroxyls of the starch under conditions of high acidity. It has been further discovered that this cross linking effect can be overcome simply by raising the pH of the acid-converted starch ether suspension to around 8.5–9 or higher (viz pH 8.5–10.5) and steeping for a short period of time, such as ½ to 2 hours. The product can be dewatered and washed in the alkaline state or neutralized and dewatered and washed. The alkali steeped product disperses readily to a low viscosity paste on cooking, indicating that the cross-links are removed.

It will be understood that whatever method of depolymerization is employed, the resulting product will have an alkali fluidity within the ranges stated above. As used herein, the term "alkali fluidity" refers to the standard starch test, as described for instance, in Chemistry and Industry of Starch, Kerr, pages 133–134, (2nd ed. 1950, Academic Press, Inc. N.Y.).

Etherified depolymerized starch products produced as described above can advantageously be employed in combination with polyvinyl alcohols of the kind which have heretofore been used as sizes or adhesives. In the industry, such polyvinyl alcohols are usually specified in terms of degree of polymerization (unit average molecular weight based on $CH_2CHOH$ monomer) and degree of hydrolysis (mole percent). In general, suitable polyvinyl alcohols have a degree of polymerization ranging from about 300 to 1900, and a degree of hydrolysis greater than 88%, preferably greater than 98%. For use as sizes, the preference is for substantially completely hydrolyzed products (98.8–100% hydrolyzed). Depending on the use to be made of the PVA, the molecular weight can be varied. For paper size applications, a preferred degree of polymerization is from about 300 to 1400, and especially advantageous are PVA's of 1000–1400. Polyvinyl alcohols of this character are available as dry powders, being sold for example, by E. I. du Pont de Nemours & Co., Wilmington, Del. under the trademark, "Elvanol." Suitable products are Elvanol 72-60, Elvanol 71-30 and Elvanol 70-05.

According to the present invention, it is preferred to employ at least 10 parts by weight of polyvinyl alcohol per 90 parts of the modified starch. The compatibility of modified starch as prepared in accordance with the present invention permits much higher proportions of polyvinyl alcohol, up to 60 parts of PVA per 40 parts of modified starch. For use as a paper size, the preferred range is about 15 parts by weight of polyvinyl alcohol per 85 parts of modified starch up to 50 parts of PVA per 50 parts of the modified starch. The granule starch and PVA powder can be dry blended in suitable mixing equipment to produce a dry mixture which can then be used to form stable size or adhesive compositions. The mixture, or the separate ingredients, can be heated in water at a temperature and for a time sufficient to gelatinize the starch and dissolve the PVA. Usually, heating at about 190-200° F. for 30 minutes will be sufficient to complete the formulation. It will be understood that the water serves as a carrier, and that the amount of water will be adjusted to produce a complete formulation of the desired viscosity. For use as a paper size, formulations having a Dudley viscosity of about 40-60 seconds at 150° F. are preferable. The Dudley viscosity is a standard test in the art, being described, for example, in Chemistry and Industry of Starch, Kerr, pages 121-122 (2nd ed. 1950 Academic Press, Inc. N.Y.).

This invention is further illustrated by the following specific examples. Unless otherwise designated, the polyvinyl alcohol (or PVA) referred to in the examples is a fully hydrolyzed (98.8% or higher) polyvinyl alcohol having a degree of polymerization ranging from 300 to 1400, such as Du Pont's Elvanol No. 71-30 (99-100% hydrolyzed; 1200 unit average molecular weight).

EXAMPLE 1

A low-substituted sodium carboxymethyl starch, containing approximately 1% by weight of COONa groups, was suspended in water in 40% solids concentration. The pH of the suspension was adjusted to around 1.0 with $H_2SO_4$ and the suspension was agitated at 120° F. for 24 hours. The acid-converted product had an alkali fluidity of 90 as measured by the test described in "Chemistry and Industry of Starch," 2d ed., by R. W. Kerr, Academic Press, N.Y., 1950, p. 133.

Acid-converted 90 alkali fluidity sodium carboxymethyl starch suspensions were neutralized to different pH levels for 1-3 hours at 110-115° F. All of the suspensions were then neutralized to pH 7.0, dewatered on a filter, and washed free of salts. The purified products were dried at room temperature.

The starches were made up in 30% dry substance concentration in water, readjusted to pH 7.0 and run in a Corn Industries viscometer with a water bath temperature of 210° F. After 30 minutes of cooking in the viscometer, Brookfield viscosities were determined at 190° F. The results of steeping the acid-converted sodium carboxymethyl starches at different pH levels before final neutralization and purification are given below in Table A:

TABLE A

| Steep pH level | C.I. visc.[1] (210° F. bath—pH 7.0), gram cm. (peak) | Brookfield visc.[1]—20 r.p.m. after 30′ cook in C.I. viscometer (190° F.), cp. |
| --- | --- | --- |
| 6.0 | 2,925 | 540 |
| 8.0 | 1,950 | 255 |
| 9.0 | 732 | 65 |
| 9.5 | 800 | 75 |
| 10.0 | 190 | 41 |

[1] The Corn Industries viscometer and Brookfield viscometer tests are described in Methods in Carbohydrate Chemistry by Whistler, vol. IV, Academic Press, N.Y. (1965), pages 117 and 122.

The above data show the effect of alkaline steeping to cause the starch product to cook out to a lower viscosity, more highly dispersed condition on subsequent cooking at pH 7.0. This is probably due to the saponification of ester cross-links formed by the action of the acid on the carboxyl and hydroxyl groups in the starch. Cross-linked starches exhibit increased peak and cooked paste viscosities and resist dispersion to colloidal sol state.

EXAMPLE 2

Unmodified starches were reacted in an alkaline suspension containing sodium chloride or sodium sulfate as a swelling inhibitor with varying proportions of sodium monochloracetate to form sodium carboxymethyl starch ethers. The suspensions were neutralized and the pH adjusted to around 1.0 with HCl or $H_2SO_4$. The acid conversions were continued until the products showed alkali fluidities of 80-90. The suspensions were adjusted to pH 9.0 with $Na_2CO_3$ and held at this pH for 1-2 hours, then neutralized to pH 7.0 with HCl, dewatered, washed free of salts on a filter, and dried. The products were analyzed for COONa content. These products and other types of starch were then cooked with the PVA (99% hydrolyzed) in a 1:1 ratio, at around 15% total solids concentration at 190° F. for 30 minutes and the viscosity of the dispersions adjusted to Dudley Pipette viscosities of 40-50 sec., at 150° F. by dilution. The dispersions were allowed to stand for 24-48 hours to determine phase separation. The results are tabulated below in Table B:

TABLE B

| Base starch | Percent —COONa content | Alkali fluidity [1] after acid conv. | Phase separation on standing 24-28 hours, 1:1 starch to PVA dispersion [2] |
| --- | --- | --- | --- |
| Corn | None | 90 | Severe. |
| Do | 0.13 | 89 | Moderate. |
| Do | 0.26 | 85 | Do. |
| Do | 0.44 | 86 | Slight. |
| Do | 0.78 | 89 | None. |
| Do | 1.15 | 82 | Do. |
| Do | 1.65 | 85 | Do. |
| Do | 2.15 | 83 | Do. |
| Do | 2.48 | 82 | Do. |
| Do | 1.07 | ([3]) | Slight. |

[1] The alkaline fluidity and Dudley hot paste viscosity tests are described in Chemistry and Industry of Starch, by Kerr, 2d. ed., Academic Press, N.Y. (1950), pages 121-122, and 133-134.
[2] Dudley viscosity 40-50 seconds at 151° F.
[3] No conversion.

EXAMPLE 3

Following the procedure of Example 2, potato starch, waxy maize and tapioca starches were prepared as acid-converted, sodium carboxymethyl starches. The results are shown below in Table C.

TABLE C

| Base starch | Percent —COONa content | Alkali fluidity | Phase separation on standing 24-48 hours, 1:1 starch to PVA dispersion [1] |
| --- | --- | --- | --- |
| Potato | 0.57 | 8 | Slight. |
| Do | 1.00 | 89 | None. |
| Waxy maize | 0.52 | 19 | Do. |
| Tapioca | 0.72 | 89 | Do. |

[1] Dudley viscosity 40-50 seconds at 150° F.

EXAMPLE 4

Unmodified starches of different varieties were reacted in an alkaline suspension containing sodium chloride or sodium sulfate as a swelling inhibitor with varying proportions of sodium monochloracetate to introduce sodium carboxymethyl ether groups into the starch. The suspensions were then neutralized to pH 7.0 with acid. Sufficient sodium hypochlorite solution, analyzing around 6-7% available chlorine and 2% NaOH, to depolymerize the starches to 80-90 alkali fluidity, was added and the suspension agitated at 95° F. for 18–20 hours. Proportions of available chlorine based on starch solids ranged from 4–5%.

The suspension were neutralized to pH 7.0, dewatered on a filter, washed free of salts, and dried. The oxidatively depolymerized sodium carboxymethyl starches were analyzed for —COO Na content and alkali fluidities were determined. The starches were tested in starch-PVA dispersions as described in Example 2. The results are given below in Table D:

TABLE D

| Base starch | —COONa content | | A.F. after conv. | Phase separation on standing 48 hours, 1:1 starch to PVA dispersion [1] |
|---|---|---|---|---|
| | Na chloracetate reaction, percent | Na hypochlorite reaction, percent | | |
| Corn | None | 1.09 | 90 | Severe. |
| Do | 0.13 | 0.65 | 89 | None. |
| Do | 0.15 | 0.67 | 88 | Do. |
| Do | 2.48 | 0.51 | 87 | Do. |
| Potato | 0.57 | 1.0 | 92 | Do. |
| Waxy maize | 0.52 | 0.84 | 90 | Do. |
| Tapioca | 0.72 | 1.28 | 92 | Do. |

[1] Dudley viscosity 40–50 seconds at 150° F.

The above data show that stable starch-PVA dispersions can be obtained with starch having as low as 0.13— COO Na content from sodium carboxymethyl substitution and which is sodium hypochlorite depolymerized to around 90 alkali fluidity. Sodium hypochlorite treatment alone does not result in a starch capable of producing stable starch-PVA dispersions under the conditions described above.

Higher proportions of sodium carboxymethyl groups together with sodium hypochlorite conversion produced starches having excellent starch-PVA dispersion stability.

EXAMPLE 5

A low-substituted sodium carboxymethyl starch, containing 1.32% sodium carboxymethyl groups, was enzyme-converted to a low viscosity according to the following procedure. The starch was slurried in water with PVA (99% hydrolyzed) in 1:1 ratio at 15% total solids concentration. Two-tenths percent calcium acetate based on starch was added. The slurry was adjusted to pH 7.0 sodium carbonate and 0.05% of a bacterial alpha amylase concentrate (Amyliq, Wallerstein Co.) was added. The slurry was heated to 170° F. and held at this temperature for 15 minutes, then heated with steam to 190–200° F. and held at this temperature for 30 minutes.

The enzyme-converted dispersion of sodium carboxymethyl starch and the PTA was adjusted to a Dudley Pipette viscosity of 40–50 seconds at 150° F. No phase separation occurred on standing for 48 hours. Regular corn starch converted to the same degree with the same enzyme treatment showed severe phase separation when under the conditions of the test.

EXAMPLE 6

Properties of paper sized with dispersions of depolymerized sodium carboxymethyl starch with PVA.

(A) Oil and grease holdout

Using TAPPI Method T454—TS66 on a commercial white patent-coated board, the following values were obtained at an add-on rate of 3.1 lbs. per 100 sq. ft. of board.

| Starch used | Starch:PVA ratio | | Penetration time, sec. |
|---|---|---|---|
| | Starch, percent | PVA, percent | |
| Blank | None | None | 5–10 |
| Hydroxyethyl corn starch, 0.1 H.E. per glucose unit | 100 | None | 70 |
| Sodium carboxymethyl starch, hypochlorite converted, 1.8% COO Na content | 75 | 25 | 237 |
| Do | 66⅔ | 33⅓ | 1,045 |
| Do | 50 | 50 | 1,800 |

The board used was surface-sized as indicated above, and the penetration time determined. The TAPPI Method citation is, 'Turpentine Test for Grease Resistance of Paper," Technical Assn. of Pulp & Paper Industry, New York, N.Y. The PVA was Du Pont Elvanol 71–30.

The above data show the greatly improved grease and oil holdout with depolymerized sodium carboxymethyl starch and PVA, especially with equal parts of PVA and starch, as compared with hydroxyethyl corn starch which has been considered effective for this purpose.

(B) Porosity

Bleached paper coating base stock was treated with a clear size having a ratio of one part PVA (Du Pont Elvanol 71–30) to three parts of depolymerized sodium carboxymethyl starch similar to that used in (A) above. It showed a substantial increase in Gurley Porosity value as compared with that given by a conventional hydroxyethylated corn starch sizing formulation. Acid depolymerized sodium carboxymethyl starch with PVA also showed improved porosity values. This improvement in porosity indicated that a more continuous and effective film had been applied. The citation of the Gurley test is, "Standard Analytical Method T 460–OS–68; Air Resistance of Paper," Technical Assn. of Pulp & Paper Industry, New York, N.Y.

EXAMPLE 7

In Table D of Example 4, a modified corn starch and its method of preparation are described, which contained 1.15% —COO Na from the chloracetate reaction and 0.67% from the hypochlorite reaction. A substantially similar product in the form of ungelatinized granule starch can be dry-blended with PVA powder to produce commercial products for admixture with water to form stable paper size compositions. The PVA can be Du Pont's Elvanol 71–30. Preferably, the starch granules and particles of PVA are similarly sized to minimize separation of the mixture. The modified starch granules and PVA powder are dry-blended to a uniform mixture in suitable mixing equipment, according to the following proportions:

| | Parts PVA (by wt.) | Parts starch (by wt.) |
|---|---|---|
| Product: | | |
| A | 1 | 1 |
| B | 1 | 2 |
| C | 1 | 3 |
| D | 1 | 4 |
| E | 1 | 5 |

The foregoing mixtures can be combined with water in suitable proportions (10–15% solids, usually about 12% solids) to produce a Dudley viscosity, after heating, within the range from 40–60 seconds at 150° F. A suitable heating procedure, which is preferably carried out with mild agitation, is 190–200° F. for 30 minutes. This will assure gelatinization of the starch and solution of the PVA. The resulting size formulation can then be checked for Dudley viscosity, and adjusted if necessary, before application to the paper.

Etherified depolymerized starch products equivalent in many ways to the products described in the foregoing specification can be obtained by first etherifying the starch with a reagent introducing carboxyethyl groups, and forming starch—O—$CH_2CH_2COOX$. These compounds can be regarded as homologues of the compounds previously described, and all of the range and limitations previously set forth are applicable thereto. Various reagents can be used to form carboxyethyl starch, as is well known in the art. For example, the starch can be reacted with acrylonitrile under alkaline conditions, or with acrylamide, or with a monochloropropionate reagent such as sodium monochloropropionate. The following example is illustrative.

EXAMPLE 8

Unmodified corn starch was reacted with the sodium salt of 3-chloropropionic acid to introduce sodium carboxyethyl groups into the starch.

Unmodified corn starch in a 40.7% dry substance concentration was treated with a mixture of 30% sodium hydroxide and 26% sodium chloride containing 3% by weight of NaOH based on starch solids and 8% by weight of NaCl based on initial water in the suspension. The salt-alkali mixture was added with vigorous agitation of the suspension to prevent localized swelling of the starch at the point of addition before the alkali was distributed throughout the suspension and 4.82% by weight of the sodium salt of 3-chloropropionic acid based on starch solids was added. An aliquot of the suspension was titrated with standard acid solution and the suspension was agitated to 115° F. until 4.3% by weight of sodium chloropropionate based on starch solids had been hydrolyzed, as indicated by the suspension titer. The suspension was then neutralized and acid-converted with $H_2SO_4$ at 110° F. until the starch product had an alkali fluidity of 78 as measured by the test described in "Chemistry and Industry of Starch," 2nd ed., by R. W. Kerr, Academic Press, N.Y., 1950. The suspension was neutralized with $Na_2CO_3$ solution, dewatered on a filter, washed substantially free of salts, and dried.

The purified product containing sodium carboxyethyl groups was cooked with PVA (99% hydrolyzed) in a 1:1 ratio, at around 15% total solids concentration at 190° F. for 30 minutes and the viscosity of the dispersion adjusted to a Dudley pipette viscosity of 40–50 seconds at 150° F. by dilution. The dispersion showed greatly improved stability and resistance to phase separation on standing 48 hours as compared with 90 fluidity acid or hypochlorite converted corn starch which showed severe phase separation under the conditions of the test.

EXAMPLE 9

Unmodified corn starch was reacted with acrylamide under strongly alkaline conditions to introduce sodium carboxyethyl groups into the starch.

Unmodified corn starch in a 40.7% dry substance concentration was untreated with a mixture of 30% sodium hydroxide and 25% sodium chloride containing 3% by weight of NaOH based on starch solids and 8% by weight of NaCl based on initial water in the suspension. The salt-alkali mixture was added with vigorous agitation of the suspension to prevent localized swelling of the starch at the point of addition before the alkali was distributed throughout the suspension and 2.4% by weight of acrylamide based on starch solids was added. The suspension was agitated for several days at 115° F. then neutralized and acid-converted with $H_2SO_4$ until the starch product had an alkali fluidity of 73 as measured by the test described in "Chemistry and Industry of Starch," 2nd ed., by R. W. Kerr, Academic Press, New York, N.Y., 1950. The suspension was then neutralized with $Na_2CO_3$ solution, dewatered on a filter, washed substantially free of salts, and dried.

The purified, depolymerized product containing sodium carboxyethyl groups was cooked with PVA (Elvanol 71–30 of Du Pont) in a 1:1 ratio, at around 15% total solids concentration at 190° F. for 30 minutes and the viscosity of the dispersion adjusted to a Dudley pipette viscosity of 40–50 seconds at 150° F. by dilution. The dispersion exhibited great stability on standing and negligible phase separation occurred during 48 hours.

What is claimed:
1. A process for preparing an etherified depolymerized starch product in granule form comprising:
    (a) first etherifying granule starch with an etherifying reagent introducing ether-linked carboxy alkyl groups selected from carboxy methyl and carboxy ethyl, said granule starch being maintained in filterable condition during said etherification;
    (b) next depolymerizing the resulting etherified granule starch at a low acid pH until the granule starch has an alkali fluidity of from 5 to 95, the resulting depolymerized starch having increased resistance to gelatinization; and
    (c) thereafter soaking the said depolymerized granule starch in alkaline water at a pH not lower than 8.5, said soaking being continued until the resistance to gelatinization resulting from said depolymerizing step is substantially overcome and the resulting starch product disperses readily on cooking.
2. The process of claim 1 in which said etherifying agent is sodium monochloracetate.
3. The process of claim 1 in which said starch is depolymerized with hydrochloric acid at a pH of around 1.0.
4. The process of claim 1 in which said soaking is at an alkaline pH of 8.5 to 10.5.
5. The process of claim 1 in which said etherifying agent in sodium monochloracetate, said depolymerizing is carried out in the presence of hydrochloric acid at a pH of about 1.0, and said soaking is at an alkaline pH of 8.5 to 10.5.

References Cited
UNITED STATES PATENTS

| | | | |
|---|---|---|---|
| 2,622,997 | 12/1952 | Lolkema et al. | 117—165 |
| 2,773,057 | 12/1956 | Hjermstad et al. | 260—233.3 |
| 2,802,000 | 8/1957 | Caldwell et al. | 260—233.3 |
| 2,928,827 | 3/1960 | Paschall | 260—233.3 |
| 3,033,852 | 5/1962 | Paschall | 260—233.3 |
| 3,450,692 | 6/1969 | Hyldon et al. | 260—233.3 |

DONALD E. CZAJA, Primary Examiner

M. I. MARQUIS, Assistant Examiner

U.S. Cl. X.R.

117—156 R; 260—17.4 ST, 233.3 A, 233.5 R